United States Patent
Obrist et al.

(10) Patent No.: US 9,654,345 B2
(45) Date of Patent: May 16, 2017

(54) ANALYZING DATA COMMUNICATION IN A PROCESS CONTROL OR SUBSTATION AUTOMATION SYSTEM

(71) Applicant: ABB Technology AG, Zürich (CH)

(72) Inventors: Michael Obrist, Untersiggenthal (CH); Wolfgang Wimmer, Rietheim (CH)

(73) Assignee: ABB Schweiz AG, Baden (CH)

( * ) Notice: Subject to any disclaimer, the term of this patent is extended or adjusted under 35 U.S.C. 154(b) by 46 days.

(21) Appl. No.: 14/334,137

(22) Filed: Jul. 17, 2014

(65) Prior Publication Data
US 2014/0328213 A1 Nov. 6, 2014

Related U.S. Application Data

(63) Continuation of application No. PCT/EP2013/050749, filed on Jan. 16, 2013.

(30) Foreign Application Priority Data

Jan. 17, 2012 (EP) ..................... 12151417

(51) Int. Cl.
*H04L 12/24* (2006.01)
*H04L 12/26* (2006.01)
*H02J 13/00* (2006.01)

(52) U.S. Cl.
CPC ............ *H04L 41/12* (2013.01); *H04L 43/028* (2013.01); *H04L 43/067* (2013.01);
(Continued)

(58) Field of Classification Search
CPC ..... H04L 41/00–41/5096; H04L 43/00–43/50; H04L 45/02; H04L 45/00; H04L 45/04
See application file for complete search history.

(56) References Cited

U.S. PATENT DOCUMENTS 5,768,148 A * 6/1998 Murphy ................. H02J 13/001
700/286
5,862,391 A * 1/1999 Salas ...................... G01D 4/002
713/300
(Continued)

FOREIGN PATENT DOCUMENTS

DE 10 2009 045 384 A1 4/2011
EP 2 109 204 A1 10/2009
(Continued)

OTHER PUBLICATIONS

International Search Report (PCT/ISA/210) mailed on Mar. 27, 2013, by the European Patent Office as the International Searching Authority for International Application No. PCT/EP2013/050749.
(Continued)

*Primary Examiner* — Warner Wong
(74) *Attorney, Agent, or Firm* — Taft Stettinius & Hollister LLP

(57) ABSTRACT

A method, an engineering tool, and a computer program element for analyzing a communication of secondary devices in a Substation Automation System for a substation are disclosed. The secondary devices are connected to a communication network for controlling an industrial process, which industrial process can include a plurality of operational aspects of primary devices. Sender secondary devices are configured to send data packets, which can include a multitude of data objects, to predetermined receiver secondary devices via the communication network, wherein the data packets transmitted via the communication network are captured, a functional interrelation or operational aspect of the secondary devices and the primary devices is retrieved from an SCD-file representing the formal configuration of the substation is retrieved, and the secondary devices are grouped according to the retrieved
(Continued)

operational aspect and a time sorted graphical representation of the data objects, the secondary devices and the operational aspects is generated.

17 Claims, 3 Drawing Sheets

(52) U.S. Cl.
CPC ........... *H02J 13/0062* (2013.01); *H04L 43/18* (2013.01); *Y02B 90/2638* (2013.01); *Y02E 60/723* (2013.01); *Y02E 60/724* (2013.01); *Y02P 90/18* (2015.11); *Y04S 10/16* (2013.01); *Y04S 10/18* (2013.01); *Y04S 40/124* (2013.01); *Y04S 40/168* (2013.01)

(56) References Cited

U.S. PATENT DOCUMENTS

| | | | | |
|---|---|---|---|---|
| 6,301,527 B1* | 10/2001 | Butland | ............... | G05B 19/042 700/286 |
| 6,901,299 B1* | 5/2005 | Whitehead | ........... | G05B 19/042 361/605 |
| 7,774,443 B2* | 8/2010 | Ewing | ....................... | G06F 1/26 340/693.1 |
| 8,161,402 B1* | 4/2012 | Edson | ................. | G06F 17/5009 702/182 |
| 8,779,916 B2* | 7/2014 | Van Camp | ......... | G05B 19/0428 340/506 |
| 2007/0132779 A1* | 6/2007 | Gilbert | ............... | G05B 19/0426 345/619 |
| 2007/0266149 A1 | 11/2007 | Cobb et al. | | |
| 2008/0127210 A1* | 5/2008 | Bosold | ................. | H04L 67/025 719/313 |
| 2008/0183406 A1* | 7/2008 | Lee | .................... | G01R 19/2513 702/58 |
| 2009/0076762 A1* | 3/2009 | Vetter | ................... | H04L 43/028 702/122 |
| 2010/0039954 A1* | 2/2010 | Wimmer | ............. | H04L 41/0853 370/252 |
| 2010/0050097 A1* | 2/2010 | McGreevy | ........... | G05B 19/409 715/762 |
| 2010/0204851 A1* | 8/2010 | Yuen | ......................... | H02J 3/06 700/297 |
| 2010/0250622 A1* | 9/2010 | Hossenlop | ......... | G06K 9/00476 707/803 |
| 2010/0256832 A1* | 10/2010 | Kirrmann | .............. | H02H 7/261 700/293 |
| 2012/0185625 A1 | 7/2012 | Kolblin et al. | | |
| 2012/0191959 A1* | 7/2012 | Kumar | .................. | H04L 67/306 713/1 |
| 2012/0226386 A1* | 9/2012 | Kulathu | .............. | H02J 13/0079 700/295 |
| 2012/0232876 A1* | 9/2012 | Misra | ...................... | H04L 41/12 703/13 |
| 2012/0239216 A1* | 9/2012 | Kulathu | .................... | H02J 3/14 700/295 |
| 2013/0215771 A1* | 8/2013 | Obrist | ................. | H04L 41/0213 370/252 |
| 2013/0232240 A1* | 9/2013 | Purusothaman | ...... | H04L 43/045 709/220 |

FOREIGN PATENT DOCUMENTS

| | | |
|---|---|---|
| EP | 2 157 731 B1 | 7/2011 |
| EP | 2 362 577 A1 | 8/2011 |

OTHER PUBLICATIONS

Written Opinion (PCT/ISA/237) mailed on Mar. 27, 2013, by the European Patent Office as the International Searching Authority for International Application No. PCT/EP2013/050749.

* cited by examiner

ANALYZING DATA COMMUNICATION IN A PROCESS CONTROL OR SUBSTATION AUTOMATION SYSTEM

RELATED APPLICATIONS

This application claims priority as a continuation application under 35 U.S.C. §120 to PCT/EP2013/050749, which was filed as an International Application on Jan. 16, 2013, designating the U.S., and which claims priority to European Application 12151417.8 filed in Europe on Jan. 17, 2012. The entire contents of these applications are hereby incorporated by reference in their entireties.

FIELD

The disclosure relates to the field of process control systems for controlling large-scale industrial processes, for example, to substation automation systems for operating substations in high and medium-voltage power networks. The disclosure also relates to a method of evaluating the data flow between intelligent electronic devices of the process control or substation automation system.

BACKGROUND INFORMATION

Process control or industrial automation systems can be used to protect, control and monitor industrial processes in industrial plants, for example, manufacturing goods, transforming substances, or generating power, as well as to monitor and control distributed primary systems like electric power, water or gas supply systems or telecommunication systems, including their respective substations. An industrial automation system can have a large number of process controllers distributed in an industrial plant or over a distributed primary system, and communicatively interconnected via a communication system.

Substations in high and medium-voltage power networks can include primary devices such as electrical cables, lines, bus bars, switches, power transformers and instrument transformers, which can be arranged in switch yards and/or bays. These primary devices can be operated in an automated way via a Substation Automation (SA) system. The SA system can include secondary devices, so-called Intelligent Electronic Devices (IEDs), responsible for protection, control and monitoring of the primary devices. The IEDs may be assigned to hierarchical levels, for example, the station level, the bay level, and the process level, the latter being separated from the bay level by a so-called process interface. The station level of the SA system can include an Operator Work Station (OWS) with a Human-Machine Interface (HMI) and a gateway to a Network Control Centre (NCC). IEDs on the bay level, also termed bay units, in turn can be connected to each other as well as to the IEDs on the station level via an inter-bay or station bus primarily serving the purpose of exchanging commands and status information.

IEDs on the process-level can include electronic sensors for voltage (VT), current (CT) and gas density measurements, contact probes for sensing switch and transformer tap changer positions, and/or intelligent actuators (I/O) for controlling switchgears like circuit breakers or disconnectors. Exemplary process-level IEDs, for example, non-conventional current or voltage transformers can include an Analogue to Digital (AD) converter for sampling of analogue signals. Process-level IEDs can be connected to the bay units via a process bus, which can be considered as the process interface replacing the conventional hard-wired process interface. The latter can connect conventional current or voltage transformer in the switchyard to the bay level equipment via dedicated copper wires, in which case the analogue signals of the instrument transformers can be sampled by the bay units.

A communication standard for communication between the secondary devices of a substation has been introduced by the International Electrotechnical Committee (IEC) as part of the standard IEC 61850 entitled "communication networks and systems in substations". For non-time critical messages, IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet as physical media. For time-critical event-based messages, IEC 61850-8-1 specifies the Generic Object Oriented Substation Events (GOOSE) directly on the Ethernet link layer of the communication stack. For fast periodically changing signals at the process level such as measured analogue voltages or currents IEC 61850-9-2 specifies the Sampled Value (SV) service, which like GOOSE builds directly on the Ethernet link layer. Hence, the standard can define a format to publish, as multicast messages on an industrial Ethernet, event-based messages and digitized measurement data from current or voltage sensors on the process level. SV and GOOSE messages are transmitted over a process bus, which may, for example, in cost-effective medium or low voltage substations, extend to neighboring bays, for example, beyond the bay to which the sensor is assigned. In the latter case, the process bus transmits, in addition to the process data, command and/or status related messages otherwise exchanged via a dedicated station bus.

SA systems based on IEC 61850 can be configured and described by means of a standardized configuration representation or formal system description called Substation Configuration Description (SCD). An SCD file includes the logical data flow between the IEDs on the basis of message types or data sets, for example, for every message source, a list of destination or receiver IEDs, the message size in terms of data set definitions, as well as the message sending rates for all periodic traffic like GOOSE, SV and Integrity reports. The SCD file likewise can include the relation between the IEDs as well as the functionality, which the IEDs execute on behalf of the substation, process or switch yard.

EP 2362577 discloses a method for analyzing a communication configuration in a process control system, wherein every network message type or data set configured for transmission from a sender to a receiver IED across an Ethernet switch-based communication network of a PC or SA system is evaluated, and a graphical representation respective of process related operational aspects of each IED involved is generated and displayed. From a logical data flow description that is part of a formal configuration representation of the PC or SA system, sender and receiver IEDs can be retrieved or determined. A single one out of a plurality of operational aspects of the process can be retrieved for each IED from the formal configuration description. Generating the graphical representation of the system includes forming groups of IEDs with identical operational aspects. Thus, the method taught by EP 2362577 can represent the IEDs involved in the network data exchange with respect to operational aspects of the process control system, and depicts message types or data sets statically configured to be transmitted between two IEDs in a manner independent of the number of actual transmits in an operating system. The consequences of IED failures or engineering errors may be recognized, and diagnosing of communication problems at a system design or engineering stage facilitated.

EP 2109204 discloses a method for analysis of a Substation Automation system, which can include an Intelligent Electronic Device and a communication network. An analyzer can be connected to the communication network and can capture messages transmitted by the IED, the messages including a first and a second value (Y1, Y2, Y3) of a particular process quantity (Y), respectively. The captured values can be displayed in a time resolved graphical manner on a screen, and, in case the first and the second value (Y1, Y2, Y3) differ, a discontinuity indicator (Z) graphically marking a change in the value of the process quantity (Y) can likewise be depicted.

EP 2157731 discloses an analysis of a communication configuration in a Process Control (PC) or Substation Automation (SA) system, by evaluating, in a manner irrespective of operational aspects related to the operation of the controlled process or automated substation, every network message, and/or respective message source, configured for transmission across a communication network of the system. From a logical data flow description that is part of a standardized configuration representation of the PC or SA system and which includes, in the form of control blocks, formal information for every message, receiver IEDs are retrieved or determined. For each retrieved receiver IED, the totality of all network messages destined for or directed to this particular receiver IED can be evaluated or processed, for example, in view of a subsequent network load analysis, Virtual Local Area Network assignment, or graphical display of the data flow. Exemplary network messages of interest can include cyclic point-to-point reports, as well as, in terms of IEC 61850, periodic or repeated real-time multicast messages (Sampled Values SV) and event-based multicast messages (Generic Object Oriented Substation Events GOOSE).

SUMMARY

A method is disclosed for analyzing communication of Logical Nodes (LNs) of a plurality of Intelligent Electronic Devices (IEDs) in an operating Process Control (PC) system for controlling an industrial process or in an operating Substation Automation (SA) system for controlling an electric power substation, wherein the PC or SA system includes a plurality of operational aspects, and wherein sender LNs of the plurality of IEDs are configured to send data packets to predetermined receiver LNs of the plurality of IEDs via a communication network of the PC or SA system, the method comprising: analyzing data packets transmitted via the communication network and identifying data packets including data indicative of events of the PC or SA system; determining, for each identified data packet, a sender LN and a receiver LN; retrieving, from a formal configuration representation of the PC or SA system, for each sender LN and for each receiver LN an operational aspect; generating a time sorted graphical representation of the events and the sender and receiver LNs of corresponding identified packets; and grouping the LNs according to the operational aspects retrieved.

An engineering tool is disclosed for an operating Process Control PC or Substation Automation SA system with a plurality of Intelligent Electronic Devices IEDs hosting Logical Nodes LNs, wherein the PC or SA system includes a plurality of operational aspects, and wherein sender LNs of the plurality of IEDs are configured to send data packets to predetermined receiver LNs of the plurality of IEDs via a communication network of the system, the engineering tool being configured to: analyze data packets transmitted via a communication network and identify data packets including data indicative of events of a PC or SA system; determine, for each identified data packet, a sender LN and a receiver LN; retrieve, from a formal configuration representation of the PC or SA system, for each sender LN and for each receiver LN an operational aspect; and generate a time sorted graphical representation of the events and the sender and receiver LNs of each corresponding identified data packet, including grouping the LNs according to the operational aspects retrieved.

A non-transitory computer program element is disclosed, which, when it is executed on a processor of an engineering tool, instructs the processor to carry out a method for analyzing communication of Logical Nodes (LNs) of a plurality of Intelligent Electronic Devices (IEDs) in an operating Process Control (PC) system for controlling an industrial process or in an operating Substation Automation (SA) system for controlling an electric power substation, wherein the PC or SA system includes a plurality of operational aspects, and wherein sender LNs of the plurality of IEDs are configured to send data packets to predetermined receiver LNs of the plurality of IEDs via a communication network of the PC or SA system, the method comprising: analyzing data packets transmitted via the communication network and identifying data packets including data indicative of events of the PC or SA system; determining, for each identified data packet, a sender LN and a receiver LN; retrieving, from a formal configuration representation of the PC or SA system, for each sender LN and for each receiver LN an operational aspect; generating a time sorted graphical representation of the events and the sender and receiver LNs of corresponding identified packets; and grouping the LNs according to the operational aspects retrieved.

BRIEF DESCRIPTION OF THE DRAWINGS

The subject matter of the disclosure will be explained in more detail in the following text with reference to exemplary embodiments, which are illustrated in the attached drawings, in which.

DETAILED DESCRIPTION

Figure 1:
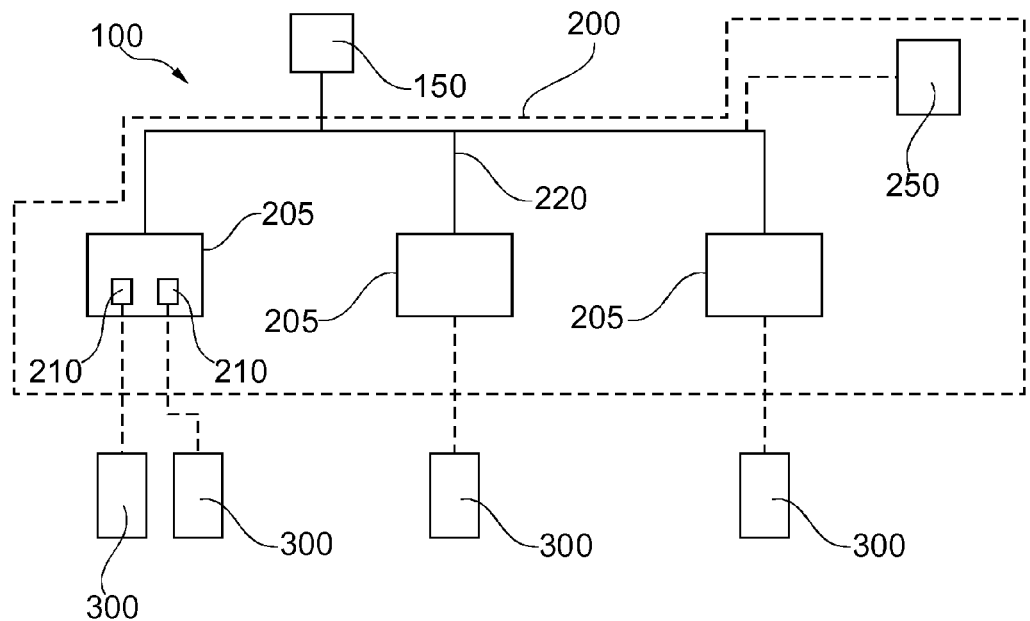
FIG. 1 schematically shows an exemplary substation with secondary devices and primary devices.

In accordance with an exemplary embodiment, the principles and methods as disclosed herein are not restricted to a use in substation automation, but likewise applicable to other process control systems with a formal system description. For example, it has to be noted that IEC 61850 is also an accepted standard for Hydro power plants, Wind power systems, and Distributed Energy Resources (DER).

In accordance with an exemplary embodiment, the disclosure relates to a method and engineering tool to analyze the data traffic in an operating process control or substation automation system and to generate a representation of the data traffic, which representation can enable an operator of the system to analyze the data traffic and to assess the message exchange and the data packets.

According to an exemplary embodiment of the disclosure, a method for analyzing a communication of, or between, for example, Logical Nodes (LNs) instantiated on a plurality of Intelligent Electronic Devices (IEDs) of an operating Process Control (PC) or Substation Automation (SA) System is disclosed. The plurality of IEDs can be connected to a communication network of the PC or SA system. The PC or SA system can be controlling, respectively, an industrial process or a substation of an electric power network with a plurality of operational aspects to one of which each IED of the plurality of IEDs may be assigned. Sender LNs of the plurality of IEDs can be configured to send data packets or messages to predetermined receiver LNs of the plurality of IEDs via the communication network.

In accordance with an exemplary embodiment, the method can include the steps of: analyzing data packets transmitted via the communication network of an operating PC or SA system and identifying, among the analyzed data packets, data packets including data indicative of events of the PC or SA system; determining, for each identified data packet the sender LN and the receiver LN; retrieving for each sender LN and for each receiver LN, from a formal configuration representation such as the SCD file of the SA system, an unambiguous LN-specific operational aspect; generating a time sorted, graphical representation of the events indicated in the identified data packets, together with the respective sender and receiver LNs of the identified data packets, wherein the LNs are grouped according to the retrieved operational aspects.

Events of the PC or SA system, which can be suitable for being graphically represented on behalf of the operator, can include, for example, commands directed to the process or substation, and status changes in the process or substation. A status change may either be communicated in a single data packet, or may be derived from a change in status information included in two successive data packets. In terms of IEC 61850, commands and status data, or status change information, may be included in reports and GOOSE messages. For example, status information of a device of the substation or of a function of the SA system may be included in the form of numerical data object values. In accordance with an exemplary embodiment, in order to properly identify data objects and data object values, the syntactical structure of a data packet, for example, the composition or assembly of a data packet with its multitude of data objects, may be retrieved from an SCD-file data set definition or from an IED related online data set definition. The events or the corresponding data objects and data object values of the identified data packets can be indicated or displayed in the graphical representation, for example, as a tag or color code.

In an exemplary embodiment, the step of identifying a data packet including data indicative of an event of the PC or SA system can include comparing a data object value of a data object of the data packet being analyzed with the last data object value of the same data object stored in a database, and identifying the event in case the values diverge. In case of GOOSE messages, the previous message may be stored in its entirety for later comparison, as each message contains all data set values. In accordance with an exemplary embodiment, a data object whose value has been changed can be important for generating the graphical representation of the data object, as this information can be essential for an operator of the substation.

In an exemplary embodiment, the data packets to be analyzed can be captured, or intercepted, with a network traffic analyzer or packet sniffer. For this purpose, the network analyzer may be connected to the communication network at a single, suitable location in the vicinity of a network interconnection device, for example, a switch, or of an operator workstation, in order to be able to capture all relevant network traffic. In accordance with an exemplary embodiment, an event log of the analyzer output may be generated and stored for subsequent processing, for example, the step of generating a time-sorted graphical representation or sequence chart of a number of consolidated events may be executed at any time.

The time sorted graphical representation can include a packet time, or packet instance, ordered representation of the identified data packets and/or the data objects included. The data packets can be depicted in the graphical representation in a chronological order along a time axis.

For every data packet being sent from a sender LN, the receiver LN may be retrieved from the formal configuration representation, for example, the SCD file. For multicast data packets devoid of a receiver LN, the relevant receiver LN to be retained for the subsequent graphical representation can be identified from a list of destination LNs included in the corresponding control block in the SCD file. The sender LN can be coded in the packet header respective known from the data packet definition by a data set.

In an exemplary embodiment, an unambiguous LN-specific operational aspect can be retrieved or determined from the SCD-file for each sender LN and for each receiver LN. The operational aspect can include a functional level, for example, a functional level below a top and/or substation level, for example, one of a VoltageLevel, Bay, Equipment, or SubEquipment level specified as the hierarchically lower functional levels in the IEC 61850-6 Substation Description for SA systems. For example, the operational aspect can be a substation bay to which the LN or the IED is assigned. Alternatively, a geographical indication corresponding to an area or site, or any hierarchical structure can be used as the operational aspect. In accordance with an exemplary embodiment, data set definitions, message-type specific information included in the IEC 61850 control blocks, or other purely communication-inherent aspects such as the definition of Virtual Local Area Networks restricting the multicast data flow within the communication network of the control or automation system, do not qualify as operational aspects related to the operation of the controlled process or automated substation.

Grouping LNs with the same operational aspect can include arranging the graphical representations of the LNs in close proximity, or otherwise graphically marking such shared property. The operational aspect itself may also be indicated to a user, by means of a tag or symbol, along with the grouped LNs. When being grouped according to the operational aspects, the LNs or the IEDs can be grouped in such a way that the functional interrelation of the secondary devices, for example, the LNs and/or the IEDs, with the primary devices can be considered and the secondary devices can be grouped accordingly.

In an exemplary embodiment, the method can include filtering the LNs of the plurality of IEDs according to an operator selection, wherein the filtering-step can be carried out prior to generating the time oriented graphical representation. For example, in case of an SA system including a large number of secondary devices, the filtering step can enable the operator to view only a part of the SA system according to his preference under given operational circumstances.

With growing sophistication of distributed functions in Process Control and Substation Automation systems the amount of real time critical data will raise and the complexity of message flow along with it. For example, this is especially true for multicast GOOSE messages according to IEC 61850 in SA systems with switched Ethernet networks. Corresponding consistency, completeness and/or correctness of the data flow definitions are not easily verified or even visualized. Graphical representation of the data objects exchanged in an operating Process Control or Substation Automation system between secondary devices grouped according to functional interrelation with the primary devices improves the reading and understanding of the data flow and the transmitted information. Grouping of the secondary devices according to operational aspects, for example, their functional interrelation with primary devices facilitates identification of communicating secondary devices and allocation of the data traffic to primary devices. Graphical representation of the data flow in the form of an event sequence chart can enable an operator of the Process Control or Substation Automation system to understand the message exchange at functional level and to identify function design errors, engineering errors or influence of IED failures. Specifically, the data packets may be continuously analyzed during runtime of the system and the graphical representation may be refreshed and updated in time with every newly captured data packet.

In accordance with an exemplary embodiment, an engineering tool or apparatus for PC or SA systems is disclosed, wherein the systems can include a plurality of Intelligent Electronic Devices (IEDs) with Logical Nodes (LNs) for controlling an industrial process or substation including a plurality of operational aspects, wherein the plurality of IEDs are connected to a communication network, wherein sender LNs of the plurality of IEDs are configured to send data packets to predetermined receiver LNs of the plurality of IEDs via the communication network. The engineering tool can be configured or adapted to execute some or all steps of: analyzing data packets transmitted via the communication network and identifying, among the analyzed data packets, data packets including data indicative of events of the PC or SA system; determining, for each identified data packet the sender LN and the receiver LN; retrieving for each sender LN and for each receiver LN, from a formal configuration representation such as the SCD file of the SA system, an unambiguous LN-specific operational aspect; generating a time sorted, graphical representation of the events indicated in the identified data packets, together with the respective sender and receiver LNs of the identified data packets, wherein the LNs are grouped according to the retrieved operational aspects.

For example, the engineering tool can include a network analyzer adapted to capture data packets transmitted via the communication network as well as a display unit for displaying the time sorted graphical representation for analysis by an operator of the PC or SA system. Other features and characteristics affecting and pertaining to the method as disclosed herein apply to the engineering tool in an analogous manner.

The engineering tool may be adapted (i.e., configured) to graphically represent data packets and data objects as a so-called live-system, for example, the captured data can be graphically represented immediately, for example to monitor or supervise a running system. In accordance with an exemplary embodiment, the engineering tool may be adapted to read a set of captured data packets from a database or a storage unit and to graphically represent the data flow in order to subsequently analyze the behavior of a process control system or a substation.

In accordance with an exemplary embodiment, a computer program element is disclosed, which, when it is executed on a processor of an engineering tool as disclosed herein, instructs the processor to carry out the method for analyzing a communication of LNs as disclosed herein.

According to a further aspect of the disclosure, a computer-readable medium is provided, which computer-readable medium includes the computer program element as disclosed herein.

It should be appreciated that depending on the engineering tool configuration and type, data storage components (computer readable media) can include volatile (such as RAM) and/or non-volatile (such as ROM, flash memory, etc.) components. Other data storage components that can be a part of the engineering tool include but are not limited to CD-ROM, DVD or other optical storage, magnetic cassettes, magnetic tape, magnetic disk storage or other magnetic storage devices, or any other medium which can be used to store the desired information and which can be accessed.

FIG. 1 shows a substation 100, including primary devices 300 and a substation automation system 200. The SA-system 200 includes a plurality of IEDs 205, of which every IED may include a plurality of logical nodes LN 210. The SCD-file 250 can include the formal configuration description of the substation 100, for example, the configuration of the IEDs and the functional interrelation of the IEDs and LNs with the primary devices. The IEDs can be interconnected via the communication network 220 in order to send and receive data packets and or messages including a multitude of data objects. A network analyzer 150 can be adapted to capture or record the data packets and messages transmitted via the communication network.

In order to generate a time oriented graphical representation of the data objects of the captured data packets being sent from sender LNs to receiver LNs, the SCD 250, the captured data and the functional interrelation of the LNs and the primary devices are considered as disclosed herein.

In accordance with an exemplary embodiment, when speaking in the terminology of the IEC 61850, data sequences can be described in terms of data exchanged between objects (for example logical nodes from IEC 61850), while the observed messages from the network analyzer can be defined by data sets grouping several data objects from different Logical Nodes, and for example, even used for different functions together, and the recorded protocol values still need to be allocated to the functional model. Thus, the disclosure provides a method for representing dynamically flowing messages as sequence chart between user-chosen objects (logical nodes, logical devices, and process related objects) down to the data object level instead of the message level.

The SCD-file according to IEC 61850 specifies in the IED section for each control block the receiver IEDs, for example, the logical data flow is described at least at IED level, possibly down to logical node level. Additionally the Substation section of the SCD-file contains the relation of the logical nodes to the parts and functions of the primary devices, for example, a switch yard.

By using these information and allocating an IED (or LN) to that functional level which contains all its LNs allocated to the substation section at all, the data flow between the IEDs (LDs) and the allocation of the IEDs to the substation functional level can be determined.

The storage of the observed messages, for example, the captured data packets, in the SA-system delivers a time/sequence order of the messages and the message contents in form of data values.

By adding the functional meaning and the source/destination information from the SCD file, a graphical representation or a sequence diagram of the data objects of the captured messages between the sending and receiving objects and the relation of these objects to the controlled process at least at IED level can be retrieved.

This graphical representation or diagram may be generated automatically and can focus on the application level and hide the details of the communication packets from a user. In accordance with an exemplary embodiment, the graphical representation or diagram can allow the user to understand the message exchange at functional level, and compare this to any intended (designed) sequences in certain situations. The transmitted values allow identifying the current situation (for example switch opening, switch interlocked, overcurrent protection working).

Figure 2:
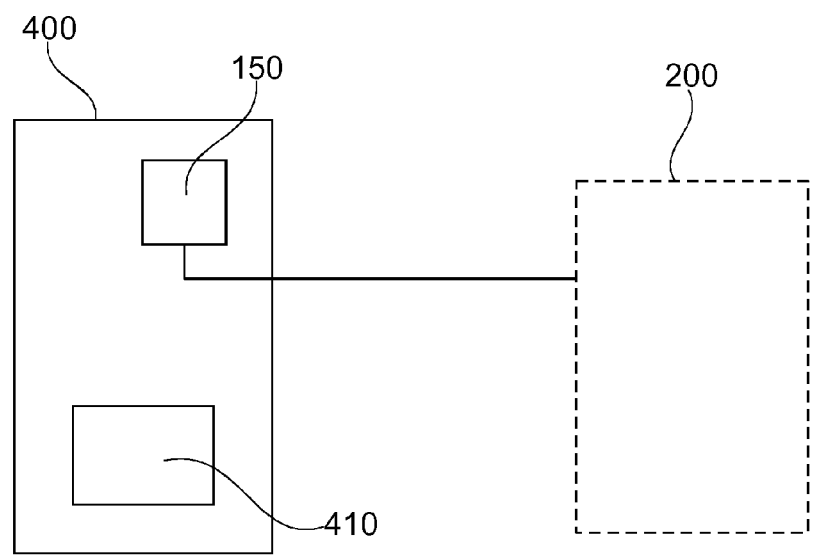
FIG. 2 schematically shows an engineering tool according to an exemplary embodiment of the disclosure.

FIG. 2 schematically shows an engineering tool 400 connected to a substation automation system 200 in order to analyze the data objects of the transmitted data packets via the communication network of the SA-system and to generate a time sorted graphical representation of the captured data and the substation elements like secondary devices and primary devices.

The engineering tool 400 can include a network analyzer 150 and a display unit 410. The display unit may be a monitor, adapted to display textual and graphical information. The engineering tool and for example the network analyzer can be interconnected to the SA-system, wherein the interconnection can be adapted to transmit the captured data packets and messages on the communication network as well as to access the SCD-file of the substation and to transmit the information read from the SCD-file to the engineering tool 400.

Figure 3:
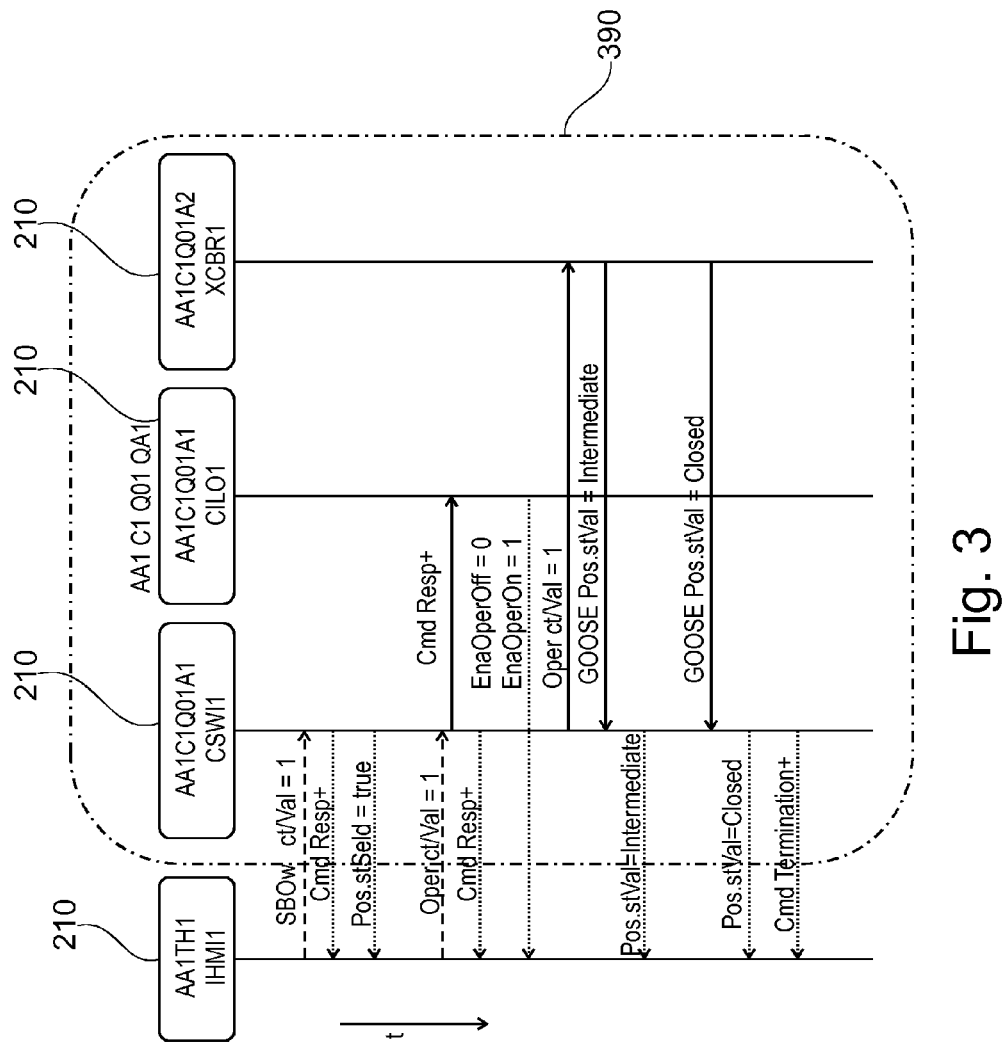
FIG. 3 shows a graphical representation of data objects and logical nodes according to an exemplary embodiment of the disclosure.

FIG. 3 schematically shows a graphical representation of four logical nodes 210 and time oriented data exchange between these LNs, wherein three of the LNs are grouped according to operational aspects or functional interrelation with the primary devices.

The messages (represented by the arrows from the left to the right and vice versa) are sent between the LNs whose vertical line the arrows touch. The messages are in a chronological order corresponding to the direction of the arrow t.

The LN "AA1TH1IHMI1" (IHMI1) initiates the communication process with a command to the "AA1C1Q01A1CSWI1" (CSWI1) which for his part sends a command to the LN "AA1C1Q01A1CILO1" (CILO1) and to the LN "AA1C1Q01A2XCBR1" (XCBR1). The commands may cause or initiate the receiver LN or IED to act on a primary device in order to have the primary device perform an action, for example, to carry out a switching operation by a switching primary device.

The CSWI1, CILO1 and XCBR1 can be assigned to the same primary device, therefore they can be grouped according to this operational aspect or functional interrelation, which functional interrelation is indicated by the box 390. The information regarding the operational aspect can be retrieved from the SCD-file of the substation. The transmitted messages can be defined by the IEC 61850 standard.

Figure 4:
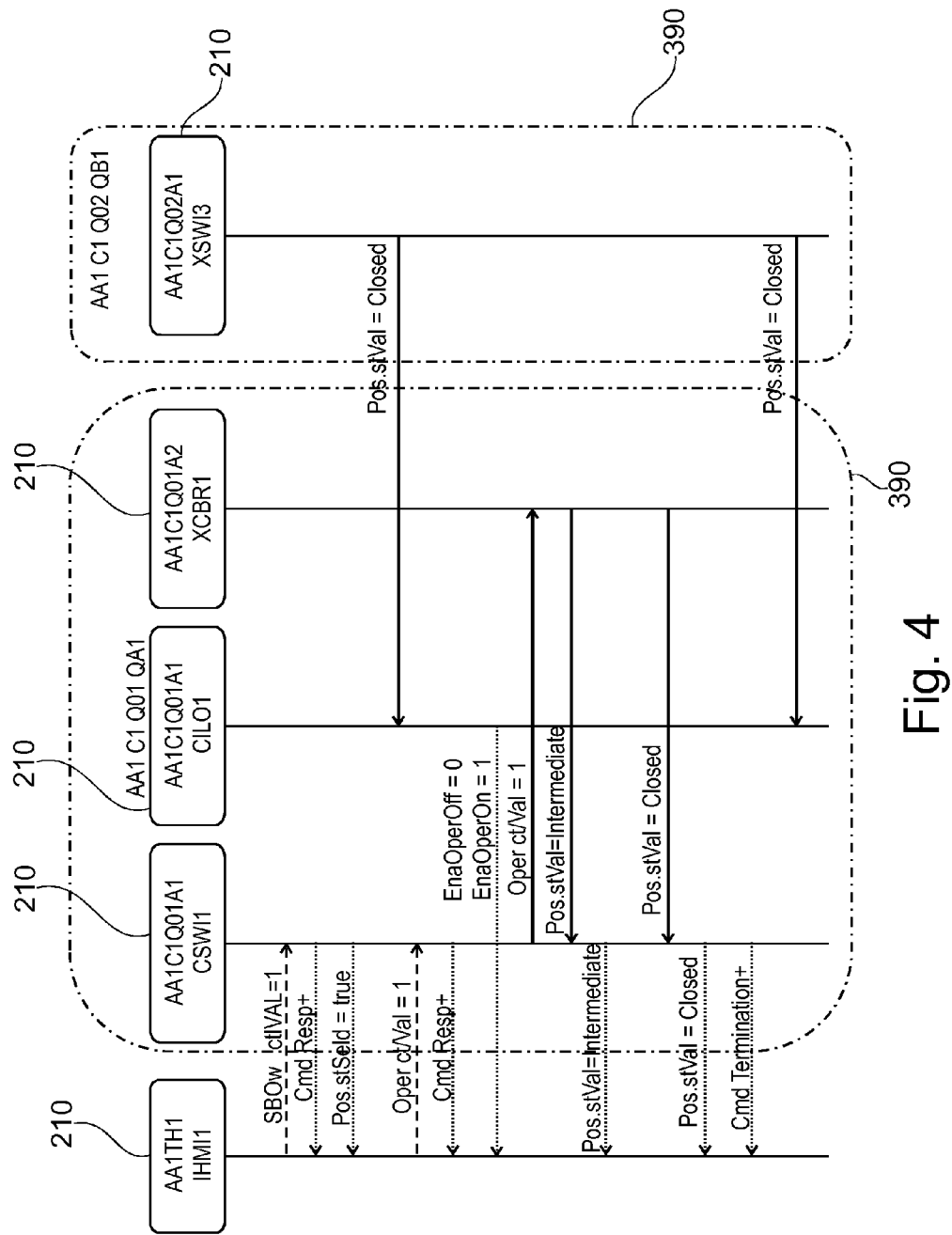
FIG. 4 shows a graphical representation of data objects and logical nodes according to an exemplary embodiment of the disclosure.

FIG. 4 shows a graphical representation of five logical nodes 210 and time oriented data exchange between these LNs. Comparable to FIG. 3, three LNs (CSWI1, CILO1 and XCBR1) are grouped together belonging to the functional aspect AA1C1Q01QA1 and one more LN "AA1C1Q02A1XSWI3" (XSWI3) is grouped separated from the first group of LNs to the functional aspect AA1C1Q02QB1.

The XSWI3 sends data to the CILO1 belonging to another operational aspect with respect to the primary devices. Furthermore, the CSWI1 and CILO1 are located logically on a first IED (AA1C1Q01A1), whereas the XCBR1 is located on a second IED (AA1C1Q01A2) and XSWI3 is located on a third IED (AA1C1Q02A1).

Thus, the graphical representation shown in FIGS. 3 and 4 facilitate an operator of the SA-system to easily detect and assign the data flow to secondary devices and the according primary devices.

The generated graphical representation during the runtime of the substation automation system may be compared with a specification graph drawn during the design time, based on the data flow given by the system designer as specification. Thus, the graphical representation may be used for maintenance purposes and for finding and eliminating errors.

The operator of a substation may choose other primary or secondary devices (for example circuit breaker, bay with protection functions) for another view of the graphical representation related to other kind of objects, and may rearrange and reposition the order of objects in the diagram.

In accordance with an exemplary embodiment, the representation characteristics like time axis and/or geographical axis of the represented devices may be adapted by the operator. The arrows could deviate from horizontal if the time for message exchange were known/essential.

It should be noted that the method as disclosed above and hereinafter may be used to group and represent both IEDs and/or LNs, which are adapted to exchange data via the communication network of a substation.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

100 Substation
150 network analyzer
200 Substation Automation System
205 Intelligent Electronic Device, IED
210 Logical Node, LN
220 communication network
250 Substation Configuration Description, SCD-file
300 primary devices
390 functional interrelation, operational aspect
400 engineering tool
410 display unit

What is claimed is:

1. A method for analyzing communication of Logical Nodes (LNs) of a plurality of Intelligent Electronic Devices (IEDs) in an operating Process Control (PC) system for controlling an industrial process or in an operating Substation Automation (SA) system for controlling an electric power substation, wherein the PC or SA system includes a plurality of operational aspects, and wherein sender LNs of the plurality of IEDs are configured to send data packets to predetermined receiver LNs of the plurality of IEDs via a communication network of the PC or SA system, the method comprising:

analyzing data packets transmitted via the communication network and identifying data packets including data indicative of events of the PC or SA system, wherein the identifying comprises comparing a data object value of a data object of the data packet being analyzed with a data object value of a same previous data object, and identifying the event in case the values diverge;

determining, for each identified data packet, a sender LN and a receiver LN;

retrieving, from a formal configuration representation of the PC or SA system, for each sender LN and for each receiver LN an operational aspect;

generating a time sorted graphical representation of the events and the sender and receiver LNs of corresponding identified packets; and grouping the LNs according to the operational aspects retrieved.

2. The method according to claim 1, wherein the data object value of the same previous data object is stored in a database.

3. The method according to claim 1, comprising:
capturing the data packets to be analyzed at a location of the communication network.

4. The method according to claim 2, comprising:
capturing the data packets to be analyzed at a location of the communication network.

5. The method according to claim 1, comprising:
displaying the time sorted graphical representation for analysis by an operator of the PC or SA system.

6. The method according to claim 1, wherein the operational aspect is a functional level according to IEC 61850-6 Substation Description for SA systems or a geographical indication to which the LN is assigned.

7. The method according to claim 6, wherein the operational aspect is a bay to which the LN is assigned.

8. The method according to claim 1, comprising:
filtering the LNs of the plurality of IEDs according to an operator selection, wherein the filtering is carried out prior to generating the time sorted graphical representation.

9. An engineering tool for an operating Process Control PC or Substation Automation SA system with a plurality of Intelligent Electronic Devices IEDs hosting Logical Nodes LNs, wherein the PC or SA system includes a plurality of operational aspects, and wherein sender LNs of the plurality of IEDs are configured to send data packets to predetermined receiver LNs of the plurality of IEDs via a communication network of the system, the engineering tool being configured to:

analyze data packets transmitted via a communication network and identify data packets including data indicative of events of a PC or SA system, wherein the identifying comprises comparing a data object value of a data object of the data packet being analyzed with a data object value of a same previous data object, and identifying the event in case the values diverge;

determine, for each identified data packet, a sender LN and a receiver LN;

retrieve, from a formal configuration representation of the PC or SA system, for each sender LN and for each receiver LN an operational aspect; and generate a time sorted graphical representation of the events and the sender and receiver LNs of each corresponding identified data packet, including grouping the LNs according to the operational aspects retrieved.

10. A non-transitory computer program element, which, when it is executed on a processor of an engineering tool, instructs the processor to carry out a method for analyzing communication of Logical Nodes (LNs) of a plurality of Intelligent Electronic Devices (IEDs) in an operating Process Control (PC) system for controlling an industrial process or in an operating Substation Automation (SA) system for controlling an electric power substation, wherein the PC or SA system includes a plurality of operational aspects, and wherein sender LNs of the plurality of IEDs are configured to send data packets to predetermined receiver LNs of the plurality of IEDs via a communication network of the PC or SA system, the method comprising:

analyzing data packets transmitted via the communication network and identifying data packets including data indicative of events of the PC or SA system, wherein the identifying comprises comparing a data object value of a data object of the data packet being analyzed with a data object value of a same previous data object, and identifying the event in case the values diverge;

determining, for each identified data packet, a sender LN and a receiver LN;

retrieving, from a formal configuration representation of the PC or SA system, for each sender LN and for each receiver LN an operational aspect;

generating a time sorted graphical representation of the events and the sender and receiver LNs of corresponding identified packets; and grouping the LNs according to the operational aspects retrieved.

11. The non-transitory computer program element according to claim 10, wherein
the data object value of the same previous data object is stored in a database.

12. The non-transitory computer program element according to claim 10, comprising:
capturing the data packets to be analyzed at a location of the communication network.

13. The non-transitory computer program element according to claim 11, comprising:
capturing the data packets to be analyzed at a location of the communication network.

14. The non-transitory computer program element according to claim 10, comprising:
displaying the time sorted graphical representation for analysis by an operator of the PC or SA system.

15. The non-transitory computer program element according to claim 10, wherein the operational aspect is a functional level according to IEC 61850-6 Substation Description for SA systems or a geographical indication to which the LN is assigned.

16. The non-transitory computer program element according to claim 15, wherein the operational aspect is a bay to which the LN is assigned.

17. The non-transitory computer program element according to claim 10, comprising:
filtering the LNs of the plurality of IEDs according to an operator selection, wherein the filtering is carried out prior to generating the time sorted graphical representation.

* * * * *